May 15, 1928. 1,670,119

A. I. MARCUM

DRIVE AXLE

Filed April 10, 1924 2 Sheets-Sheet 1

INVENTOR
Arthur I. Marcum
BY White Prost Evans
his ATTORNEYS.

Patented May 15, 1928.

1,670,119

UNITED STATES PATENT OFFICE.

ARTHUR I. MARCUM, OF OAKLAND, CALIFORNIA, ASSIGNOR TO EMORY WINSHIP, OF SAN FRANCISCO, CALIFORNIA.

DRIVE AXLE.

Application filed April 10, 1924. Serial No. 705,482.

The invention relates to drive axles for vehicles, such as automobiles and motor trucks, and particularly to a through-drive axle for use on vehicles having a pair of drive axles arranged in tandem.

An object of the invention is to provide a single reduction gear through-drive axle.

Another object of the invention is to provide a through-drive axle which provides a differential drive between the driving shafts of the two axles and a differential drive between the two axle shafts of the front driven axle.

A further object of the invention is to provide a through-drive axle of simple construction, formed of standard automotive parts.

The invention possesses other advantageous features, some of which with the foregoing, will be set forth at length in the following description, where I shall outline in full that form of my invention which I have selected for illustration in the drawings accompanying and forming part of the present specification. In said drawings I have shown one form of axle embodying my invention, but it is to be understood that I do not limit myself to such form, since the invention, as set forth in the claims, may be embodied in a plurality of forms.

Referring to said drawings.

Figure 1:
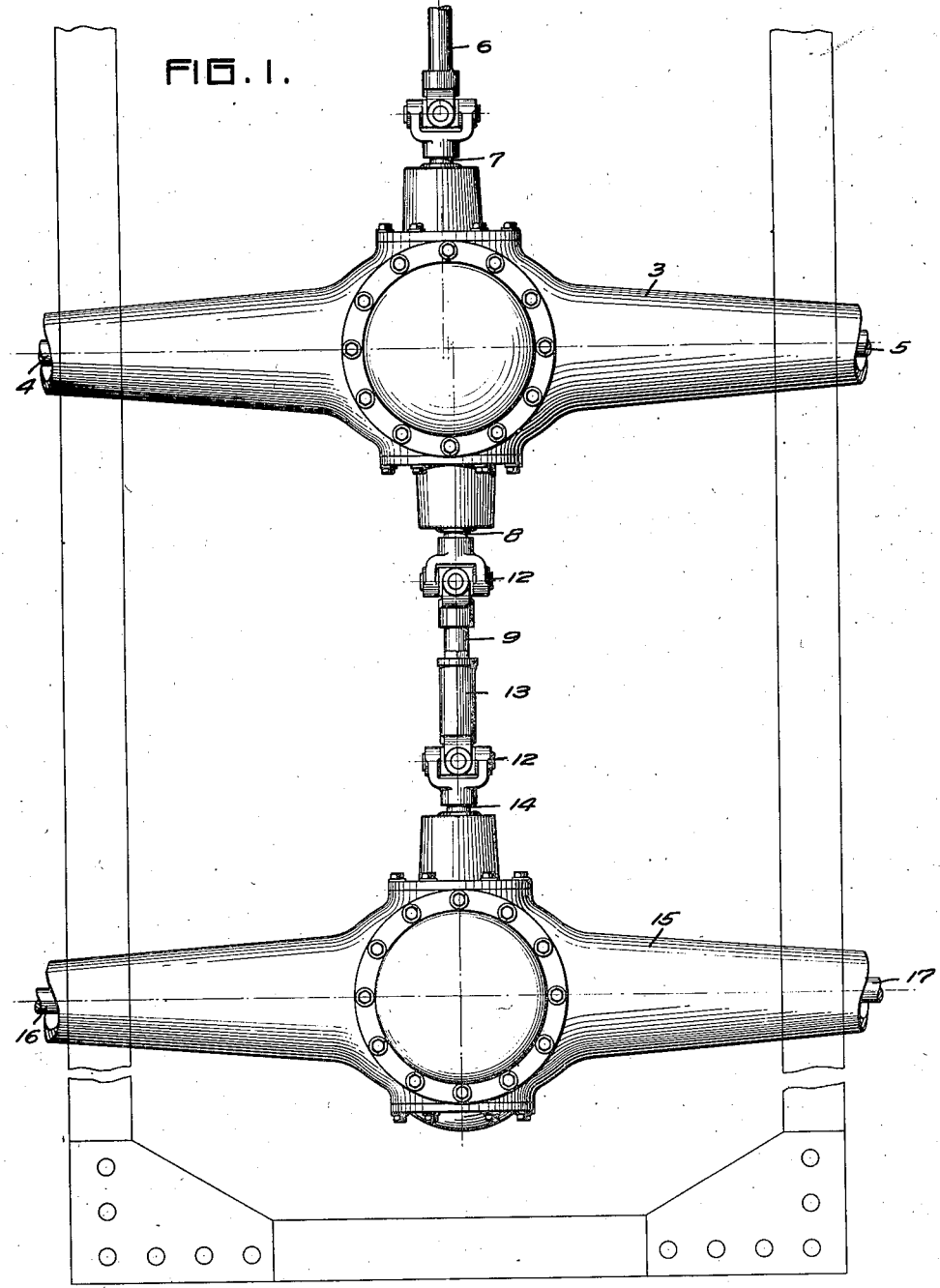
Figure 1 is a plan view of two drive axles arranged in tandem, the ends of the axle housings being removed to reduce the size of the figure.
Figure 2:
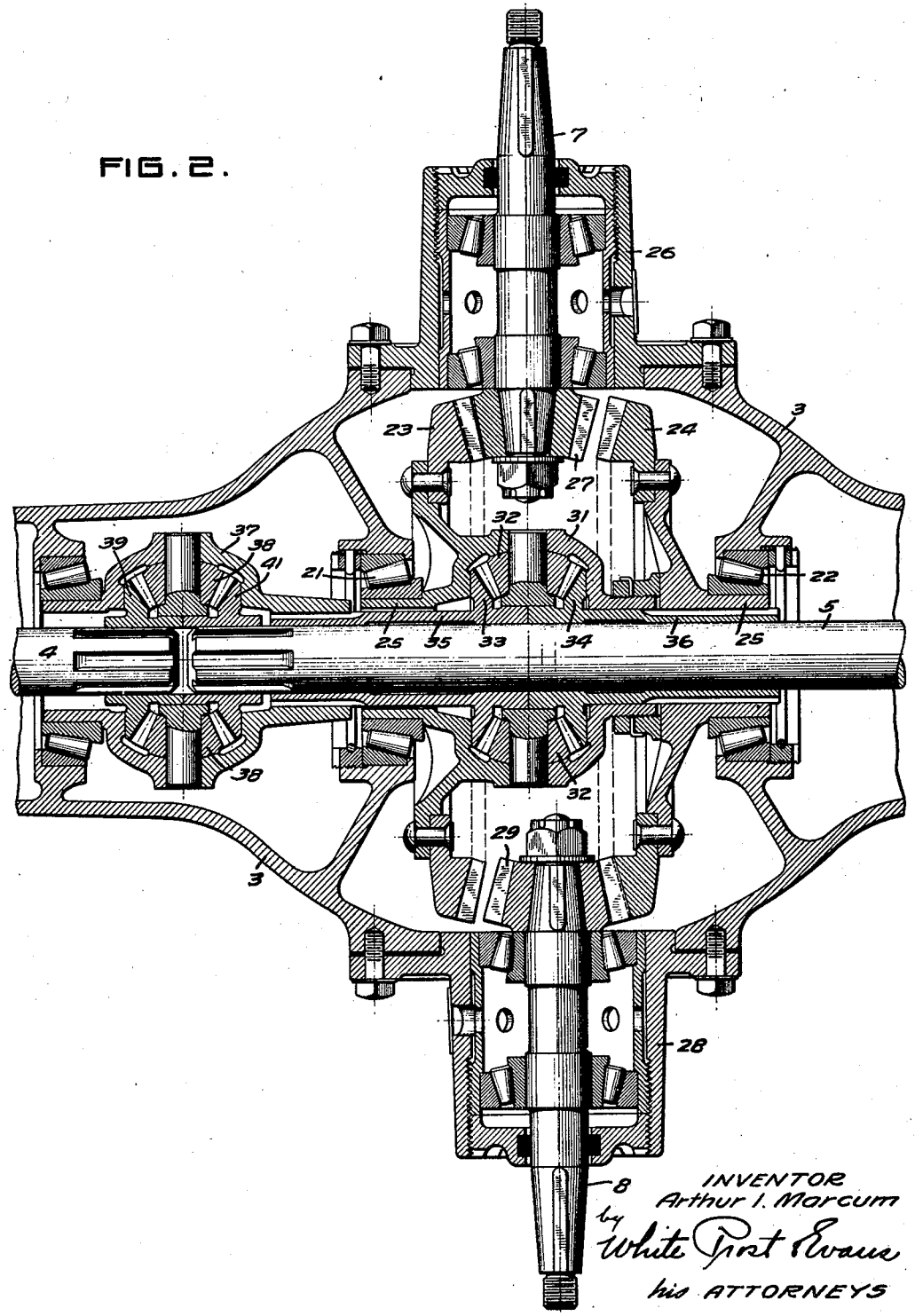
Figure 2 is a longitudinal horizontal section through the central portion of the front or through-drive axle.

My invention relates particularly to a through-drive axle, that is, an axle to which power is applied to drive the vehicle and from which power is taken to drive a second vehicle driving axle. These axles are usually arranged in tandem and in rather close relation and the propeller shaft drives through the front axle to the rear axle. The rear axle may be of standard construction. The front axle, or through-drive axle, is provided with a housing 3 which is provided with driving axle parts 4—5. The propeller shaft 6 of the vehicle is suitably connected with the driving shaft 7, which extends into the housing, and this driving shaft 7 is suitably connected, as will be set forth hereinafter, with the driving axle parts 4 and 5, and the driven shaft 8 which extends from the housing on the opposite side from the driving shaft 7. The driven shaft 8 is connected, by means of a connecting shaft 9, having suitable universal joints 12 and a slip joint 13 with the driving shaft 14 of the rear axle, which is contained within the housing 15. The driving shaft 14 is suitably connected within the housing with the drive axle parts 16 and 17 and, in accordance with the standard construction, a differential is arranged within the housing 15 between the axle parts 16 and 17, so that the wheels which are secured to the axle parts 16 and 17, are differentially driven. A differential is arranged in the housing 3 between the drive axle parts 4 and 5 and a differential is arranged between the master gear in the housing 3 and the master gear in the housing 15, so that all four driving wheels are differentially driven.

Journalled in the housing 3 by suitable bearings 21—22 are two axially alined master gears 23—24 preferably of the same diameter. These master gears 23 and 24 are provided with hollow hubs 25 which extend into the bearings. Secured to the housing 3 on its forward side is a bearing cage 26 containing the bearings for the driving shaft 7, which shaft is provided on its inner end with a pinion 27 meshing with the master gear 23. The master gears 23 and 24 are spaced apart axially a sufficient distance so that the master gear 24 clears the pinion 27. The housing is provided on its rear side with a bearing cage 28 in which is arranged the bearing for the driven shaft 8 and secured to the inner end of this shaft is a pinion 29 which meshes with the master gear 24.

Secured to or formed integrally with the master gear 23 is a differential housing 31 which carries a plurality of rotatable pinions 32 which mesh with the differentially driven gears 33 and 34. These gears 33 and 34 are provided with elongated hollow hubs 35 and 36, the gear 24 being secured to the hub 36 so that the master gear 24 rotates synchronously with the differentially driven gear 34. Secured to the end of the hollow hub 35 is a differential housing 37 carrying pinions 38 which mesh with differentially driven gears 39 and 41 which are secured respectively to the two parts 4 and 5 of the drive axle.

By virtue of this construction a differential gear is interposed between the master gear 24 and the differential housing 37, so that the differential housing 37 and the differential housing in the rear axle housing 15 are differentially driven. Differentials are also interposed between the two axle parts in each housing so that all four axle parts are differentially driven. By forming the gears 23 and 24 of the same diameter the driving shaft 7 and the driven shaft 8 are driven at the same speed, unless their relative speeds are varied by the action of the differential. The shafts 7 and 8 are substantially in axial alinement, being only sufficiently displaced to provide clearance between the master gear 23 and the pinion 29 on the driven shaft. This through-drive axle produces only a single reduction in speed between the driving shaft 7 and the driving axle parts 4 and 5, so that it may be used for vehicles which must be driven at substantially high speeds and may also be used in connection with relatively low speed engines.

I claim:

1. A through-drive axle comprising an axle housing, a pair of master gears journalled in said housing, a driving pinion engaging the first master gear, a differential housing secured to the first master gear, differentially driven gears in said housing, sleeves rotatable with said differential gears, one of said sleeves being secured to the second master gear, a driven pinion engaging said second master gear, a two-part drive axle in said housing and a differential gear interposed between the other sleeve and the two parts of said axle.

2. A through-drive axle comprising a housing, a driving shaft extending into the housing at one side, a driven shaft extending from the housing at the opposite side, a two part drive axle journalled in the housing, a pair of master gears concentric with the axis of said drive axle, a pinion on the driving shaft meshing with the first master gears, a pinion on the driven shaft meshing with the second master gear, a differential interposed between the two axle parts and a second differential interposed between the second master gear and the first differential.

3. A through-drive axle comprising a housing, a two part drive axle journalled in said housing, differential driving means for said two axle parts, a pair of master gears, a drive shaft connected to the first master gear, a driven shaft connected to the second master gear and a differential driven by the first master gear and interposed between the said differential driving means and the second master gear.

4. A through-drive axle comprising a housing, a driving shaft extending into the housing at one side, a driven shaft extending from the housing at the opposite side, a drive axle in the housing, a pair of master gears in the housing concentric with the drive shaft, said gears being connected respectively to the driving and driven shafts, a differential housing connected to one of said master gears, and differentially driven gears in said housing connected respectively to the other master gear and to the drive axle.

5. A through-drive axle comprising a housing, a driving shaft extending into the housing at one side, a driven shaft extending from the housing at the opposite side, pinions on said shafts, a master gear journalled in the housing, a drive axle concentric with the master gear, a differential housing secured to the master gear, differential pinions carried by said housing, differential gears meshing with said differential pinions, a gear secured to one of said differential gears and meshing with the pinion on the driven shaft and power transmission means connecting the other differential gear with the drive axle.

6. A through-drive axle comprising a housing, a driving shaft extending into the housing at one side, a driven shaft extending from the housing at the opposite side, pinions on said shafts, a master gear journalled in the housing, a two part drive axle concentric with said master gear, a differential housing secured to the master gear, differential pinions carried by said housing, differential gears meshing with said differential pinions, power transmission means connecting one of the differential gears with the pinion on the driven shaft and power transmission means including a differential connecting the other differential gear with the two parts of the drive axle.

7. A through-drive axle comprising a housing, a driving shaft extending into the housing at one side, a driven shaft extending from the housing at the opposite side, pinions on said shafts, a master gear journalled in the housing, a two part drive axle concentric with said master gear, a differential housing secured to the master gear, differential pinions carried by said housing, differential gears meshing with said differential pinions, power transmission means connecting one of said differential gears with the pinion on the driven shaft, a differential housing secured to the other differential gear, pinions carried by said latter housing and differential gears secured to the axle parts meshing with said latter pinions.

8. A through-drive axle comprising a housing, a driving shaft extending into the housing at one side, a driven shaft extending from the housing at the opposite side, pinions on said shafts, a master gear journalled in the housing, a two part drive axle concentric with said master gear, a differential housing secured to the master gear, differential pinions carried by said housing, differential gears meshing with said differential pinions, a second master gear axially alined with the first master gear and secured to one of said differential gears, said second master gear being in mesh with the pinion on the driven shaft, a differential housing secured to the other differential gear, pinions carried by said latter housing and differential gears secured to the axle parts meshing with said latter pinions.

9. A through-drive axle comprising a housing, a pair of axially alined master gears of equal diameter journalled in said housing, hollow hubs on said gears, a driving shaft operatively connected with one of said master gears, a driven shaft operatively connected with the other master gear, a differential housing secured to said one master gear, differentially driven gears in said housing, hollow hubs on said differential gears journalled in said aforementioned hollow hubs, one of said latter hubs being secured to said second master gear, a second differential housing secured to the other latter hub, differentially driven gears in said second differential housing and alined drive axles respectively secured to said latter differential gears, one of said axles extending through the hollow hubs of the first mentioned differential gears.

10. In combination, a housing, a propeller shaft journalled in the housing, a through shaft section, and axle sections at right angles to said through shaft sections supported in said housing, a differential between said axle sections and a differential between said first named differential and said through shaft, said differentials being arranged to turn on an axis that is substantially coincident with the axis of the axle sections.

11. A drive mechanism for a tandem axle road vehicle comprising a housing for one of said axles, a propeller shaft extending into said housing, a drive shaft for the other axle journalled in said housing with its axis out of alignment but substantially parallel to the axis of said propeller shaft, axle sections journaled in said housing, a differential mechanism between said axle sections, a second differential mechanism journaled in said housing, means to operatively connect said last named differential to said propeller shaft, and means to connect said last named differential to said first named differential and to said drive shaft to differentially drive said differential and shaft.

12. A drive mechanism such as defined in claim 11 in which the differentials rotate about a common axis.

13. A drive mechanism for a tandem axle road vehicle comprising a housing for one of said axles, a propeller shaft extending into said housing, a drive shaft for the other axle extending into said housing, axle sections journaled in said housing, a differential mechanism between said axle sections, a second differential journaled in said housing for rotation about the axis of the axle sections, means to operatively connect said last named differential to said propeller shaft, and means to operatively connect said last named differential to said first named differential and to said drive shaft to differentially drive them.

In testimony whereof, I have hereunto set my hand.

ARTHUR I. MARCUM.